(No Model.)
J. B. POWELL.
SPROCKET CHAIN.
No. 592,713. Patented Oct. 26, 1897.
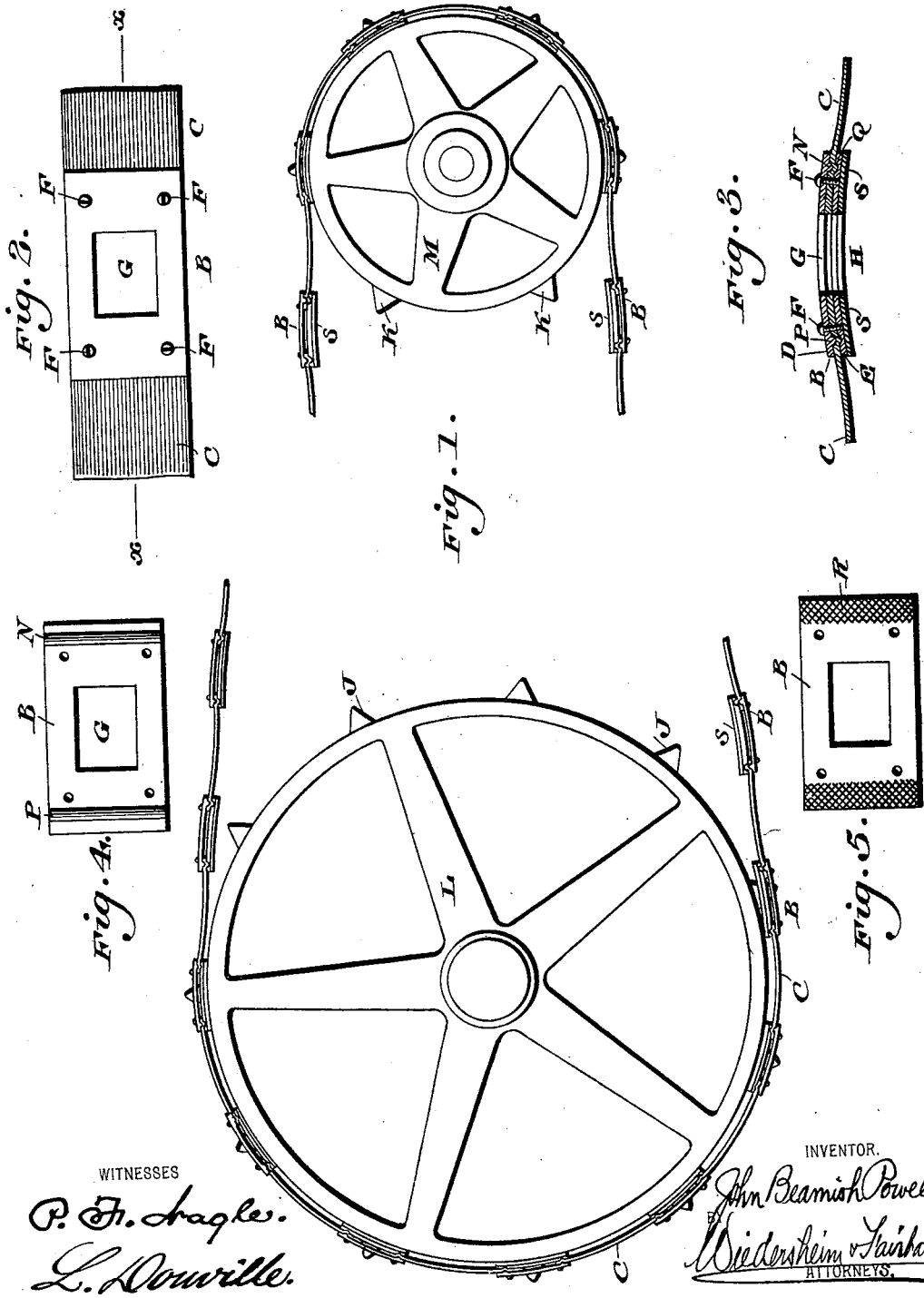
WITNESSES
P. F. Nagle.
L. Douville.
INVENTOR
John Beamish Powell
Wiedersheim & Fairbanks
ATTORNEYS.

ced by the plate hooks hope# UNITED STATES PATENT OFFICE.

JOHN BEAMISH POWELL, OF PHILADELPHIA, PENNSYLVANIA.

SPROCKET-CHAIN.

SPECIFICATION forming part of Letters Patent No. 592,713, dated October 26, 1897.

Application filed July 7, 1897. Serial No. 643,698. (No model.)

*To all whom it may concern:*

Be it known that I, JOHN BEAMISH POWELL, a citizen of the United States, residing in the city and county of Philadelphia, State of Pennsylvania, have invented a new and useful Improvement in Sprocket-Chains, which improvement is fully set forth in the following specification and accompanying drawings.

My invention consists of an improved construction of sprocket-chain in which the use of links pivotally attached to each other is avoided, thus reducing friction to a minimum and prolonging the life of the chain.

It further consists of novel details of construction, all as will be hereinafter set forth, and fully pointed out in the claims.

Figure 1 represents a side elevation of a portion of a chain embodying my invention, the same being shown mounted upon the sprocket-wheels. Fig. 2 represents a plan view of a link and portions of resilient strips which are secured to said link. Fig. 3 represents a vertical sectional view on line *x x*, Fig. 2. Fig. 4 represents a plan view of one plate which is used to form a link. Fig. 5 represents a plan view of a plate, the ends thereof being serrated.

Similar letters of reference indicate corresponding parts in the figures.

Referring to the drawings, A designates a sprocket-chain, the same consisting of the links B and the resilient strips C, the links B being formed of plates D E, which are suitably secured together by the screws or bolts F, said plates having the openings G and H therein for the reception of the teeth J K, which are on their respective parts L and M.

The resilient strips C are adapted to be secured between the said plates D and E and have the said screws or bolts F passing therethrough, which hold the same in position.

On the inner face of one of the plates—in the present instance on D—are provided the ridges or tongues N and P, which are adapted when the parts are assembled to engage grooves in the strips C, the latter being provided with ridges Q, which enter the depressions or grooves in the other plates—in the present instance in E—it being thus seen that when the parts are assembled a very strong and rigid connection is formed, the separation of which cannot be effected without removing the screws.

If desired, I may serrate the edges of the plates, as at R, thereby attaining the same action similarly to the ridges and grooves to assist in holding the parts. If desired, rubber S or other suitable material may be placed upon the under side of the plate nearest the sprocket-wheel.

The operation of the device is readily seen, it being noticed that the chain can conform to the various shapes and sizes of the sprocket-wheels, owing to the resilient strips, the teeth of the sprockets entering the openings in the plates, as will be best understood from Fig. 1.

It will be seen from the foregoing that a very strong, durable, resilient, and light sprocket-chain is produced, and since the same has no joints or pivotally-attached parts friction is reduced to a minimum and liability of the joints being injured by dust getting therein is entirely obviated, it being also noted that no lubrication is necessary.

It will of course be evident that by this construction should any of the strips break or be injured the same can be easily and quickly replaced by simply removing the screws from the broken piece and inserting a new strip.

It will of course be evident that it is not necessary to form the strips with ridges and depressions, as a portion of the strip will be forced in the one plate by the ridge on the other when the parts are assembled.

Having thus described my invention, what I claim as new, and desire to secure by Letters Patent, is—

1. A sprocket-chain having links formed of plates having openings therein, resilient strips which are adapted to be rigidly secured between said plates and means on said plates to assist in holding said strips in position.

2. A sprocket-chain provided with links formed of plates having openings therein, means for securing said plates together, strips which are adapted to be secured between said plates and tongues and grooves common to said plates to assist in holding said strips in position.

3. A sprocket-chain having links formed of plates, openings therein, screws for securing said plates together, resilient strips through which the screws pass and hold the same between said plates and tongues and grooves on said plates adapted to engage said strips.

4. A sprocket-chain consisting of links formed of plates provided with openings therein, means for securing said plates together, strips which are adapted to be secured between said plates, tongues and grooves common to the latter to assist in holding said strips in position, and a strip of rubber or similar material suitably secured to that side of each plate nearest to the sprocket-wheel.

JOHN BEAMISH POWELL.

Witnesses:
JOHN A. WIEDERSHEIM,
WM. C. WIEDERSHEIM.